(Model.)

3 Sheets—Sheet 1.

L. SOULE & H. R. PACKARD.
MACHINE FOR MAKING CUT NAILS.

No. 244,494.

Patented July 19, 1881.

Witnesses,
W. J. Cambridge
C. R. Darling

Inventors,
Leander Soule
Henry R. Packard
per F. Teschemacher
Atty

N. PETERS, Photo-Lithographer, Washington, D. C.

(Model.) 3 Sheets—Sheet 2.
L. SOULE & H. R. PACKARD.
MACHINE FOR MAKING CUT NAILS.

No. 244,494. Patented July 19, 1881.

Witnesses,
N. J. Cambridge
C. R. Darling

Inventors,
Leander Soule
Henry R. Packard
per F. E. Tetschemacher
Atty (Model.)
3 Sheets—Sheet 3.
L. SOULE & H. R. PACKARD.
MACHINE FOR MAKING CUT NAILS.
No. 244,494.
Patented July 19, 1881.
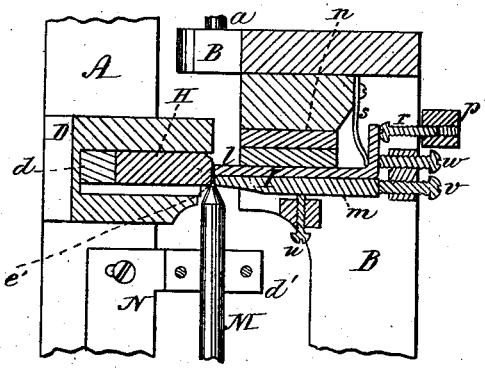
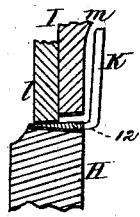
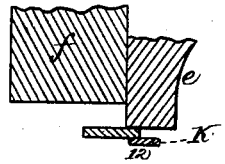
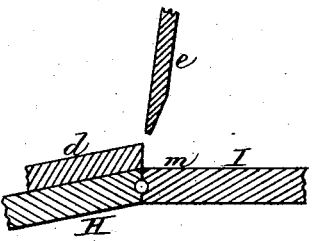
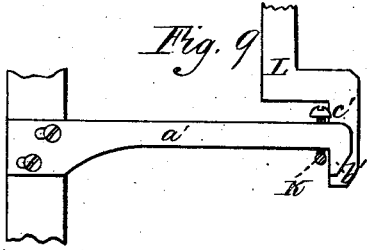
Witnesses,
W. J. Cambridge
C. R. Darling
Inventors,
Leander Soule
Henry R. Packard
per F. O. Tischemacher
Atty

UNITED STATES PATENT OFFICE.

LEANDER SOULE AND HENRY R. PACKARD, OF TAUNTON, MASS., ASSIGNORS OF ONE-HALF TO THE ALBERT FIELD TACK COMPANY, OF SAME PLACE.

MACHINE FOR MAKING CUT-NAILS.

SPECIFICATION forming part of Letters Patent No. 244,494, dated July 19, 1881.

Application filed December 20, 1880. (Model.)

*To all whom it may concern:*

Be it known that we, LEANDER SOULE and HENRY R. PACKARD, of Taunton, in the county of Bristol and State of Massachusetts, have invented certain Improvements in Machines for Making Cut-Nails, of which the following is a full, clear, and exact description, reference being had to the accompanying drawings, making part of this specification, in which—

Figure 1:
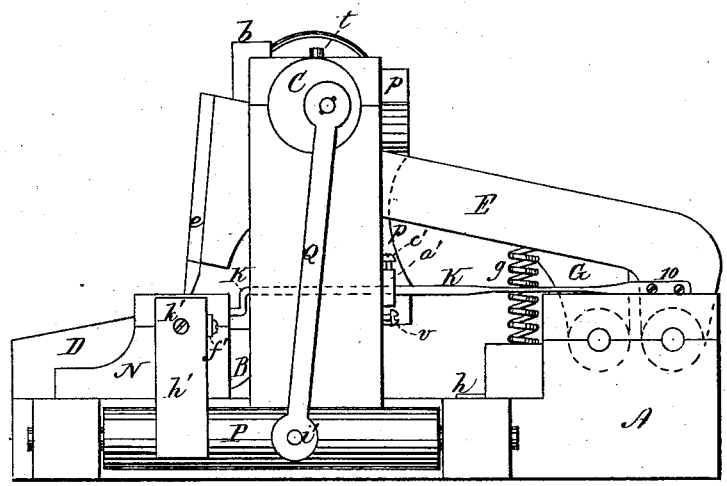
Figure 2:
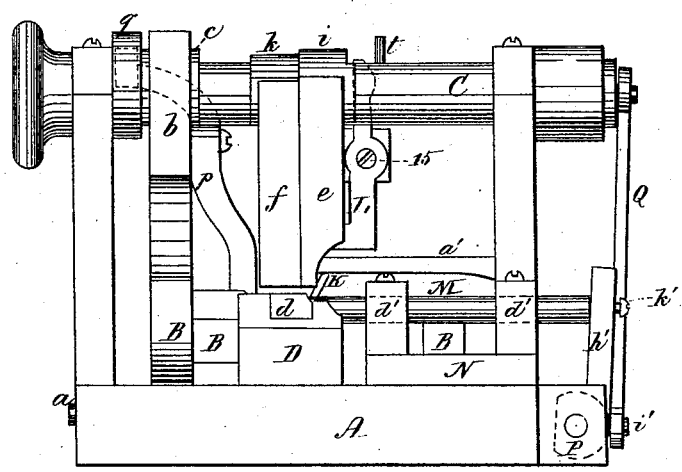
Figure 3:
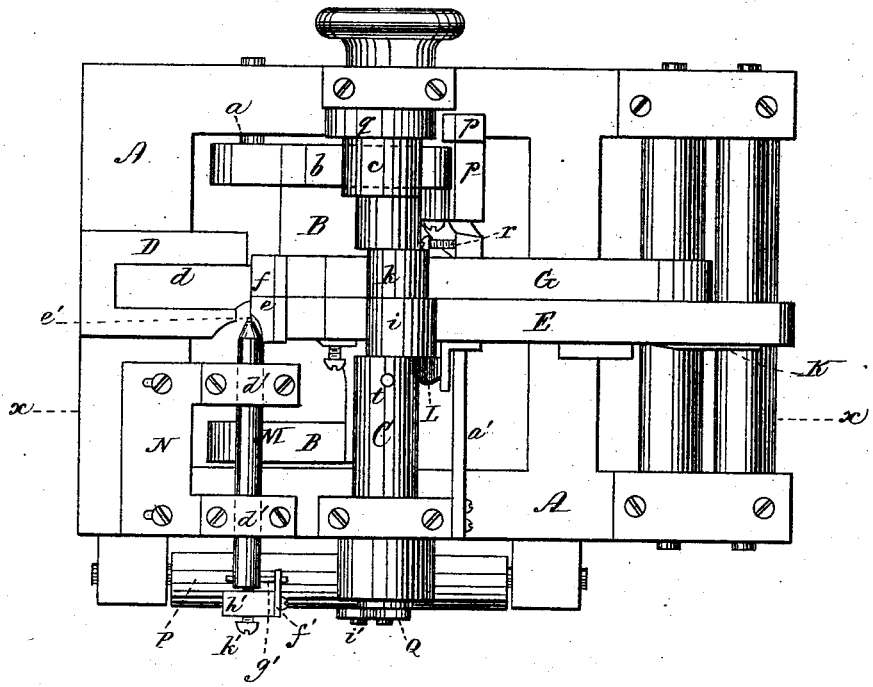
Figure 4:
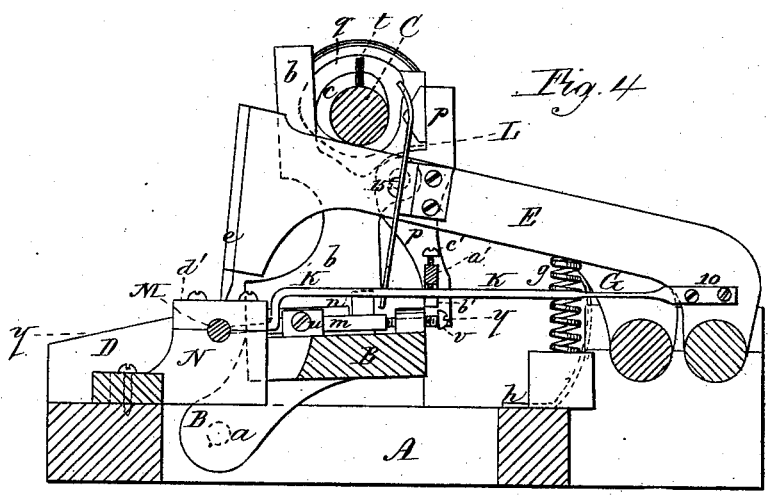

Figure 1 is a side elevation of a nail-machine having our improvements applied thereto. Fig. 2 is a front elevation of the same. Fig. 3 is a plan of the same. Fig. 4 is a vertical section on the line $x\ x$ of Fig. 3. Fig. 5 is a horizontal section on the line $y\ y$ of Fig. 4; Figs. 6, 7, and 8, sectional details enlarged; Fig. 9, detail in elevation.

In machines for making tacks, nails, &c., as heretofore constructed, it has been found impossible to inclose the entire length of the blank within the griping-dies in order to produce notches or corrugations from one end to the other, as is sometimes desirable, for the reason that a portion of the blank at its larger end (which portion was necessarily held between the upper cutter and carrier) projected beyond the griping-dies, which caused the larger or upper end of the nail to be left plain and smooth, instead of being notched or indented, as required.

Our invention has for its object to overcome this difficulty and to construct a machine in which the entire length of the blank is inclosed within and acted upon by the griping-dies, so as to allow the latter to notch, indent, or corrugate the entire length of the nail; and our invention consists in making the movable die of the griping-dies in two portions, which are brought successively into contact with the blank, one portion advancing and holding the blank in position between the dies to allow time for the carrier (which carries the blank from the cutters to the dies) to be withdrawn from between them, after which the second portion of the die is advanced, thereby inclosing the entire blank, when both portions of the movable die are advanced together to simultaneously compress the blank, in order that it may be notched or corrugated throughout its entire length, as required.

Our invention also consists in the combination, with a pair of griping-dies having the movable one made in two pieces, adapted to successively come into contact with the blank, of a carrier adapted to move down between the dies to deposit the blank therein and afterward be withdrawn out of the way to allow the dies to entirely inclose and compress the blank throughout its entire length.

To enable others skilled in the art to understand and use our invention, we will proceed to describe the manner in which we have carried it out.

In the said drawings, A represents the bed of the machine, to which is pivoted at $a\ a$ the griping-carriage B, the lever $b$ of which is acted upon by a cam, $c$, on the horizontal driving-shaft C, which runs in bearings in standards rising from the bed A.

$d$ is the bed-cutter, which is secured, as usual, in the block D, and $e\ f$ are the upper or movable cutters, which are secured to their respective levers E G, operated, as usual, independently of each other against the resistance of suitable springs, $g\ h$, by means of cams $i\ k$ on the shaft C.

H I are the griping-dies, the stationary or bed die H being secured, as usual, in the block D, immediately beneath the bed-cutter $d$, Fig. 5, while the movable die I is composed of two separate portions, $l\ m$, which are caused to act successively upon the nail, as will be hereinafter more particularly described.

K is the carrier, which consists of a long spring-rod secured at 10 to the lever E, its opposite end, 12, Fig. 6, which is bent at a right angle, lying immediately beneath the "leading cutter" $e$, in order that the large end of the blank may be held between this cutter and the bent end of the carrier, and thence carried, as usual, by the downward movement of the cutter $e$ into a position opposite the scores or grooves of the griping-dies. As soon as this has been accomplished the portion $l$ of the die I, which slides in a guideway, $n$, on the carriage B, is advanced just sufficiently to hold the blank securely in place between it and the die H, which movement is effected by means of a lever, $p$, pivoted to the lever $b$, and actuated by a cam, $q$, on the shaft C, the lower end of this lever $p$ being provided with an adjustable screw, $r$, which, at the proper time, is brought into contact with the bent end of the portion *l* of the die I and advances it against the resistance of a spring, *s*. A pin or projection, *t*, on the shaft C now strikes the inclined end of a lever, L, pivoted at 15 to a projection on the lever E, the lower end of this lever L being thus caused to move the carrier K laterally, so as to withdraw its bent end 12 out from between the griping-dies, after which it is allowed to rise with the cutter *e* and spring back laterally into its normal position, the pin *t* having passed out of contact with the lever L. The carrier being now out of the way, the other portion, *m*, of the die I, which is secured in place by screws *u v*, is then advanced by the forward movement of the carriage B until its end is even with the end of the portion *l* (previously advanced) and in contact with the blank, when a set-screw, *w*, on the carriage comes into contact with the bent end of the portion *l* of the die I, as seen in Fig. 5, when both portions of the die are advanced together by the continued forward movement of the carriage B, thus simultaneously compressing the blank and producing notches, indentations, or corrugations throughout its entire length, as required—a desideratum heretofore unattained in any nail-machine with which we are acquainted. During the time that the carriage B is advancing to bring the end of the portion *m* even with the end of the portion *l* the lever *p* is allowed to recede by its cam *q*, so as to withdraw the screw *r* from the bent end of the portion *l*, and thus allow the latter to slide in its guideway *n* until the screw *w* is brought into contact therewith, which device allows the portion *l* of the die to remain stationary during the first part of the forward movement of the carriage B, and insures both parts *l m* completing their forward movement together, so as to simultaneously compress the nail.

*a'* is an arm secured to and made adjustable on one of the standards, this arm having a hooked end, *b'*, Fig. 9, which fits over the carrier-rod K, and a set-screw *c'*, and by means of this arm and its set-screw the position of the bent end 12 of the carrier with respect to the cutters and dies can be adjusted with the greatest degree of nicety.

The two parts *l m* of the die I may be adjusted in the direction of their length to compensate for wear or other purposes by means of the screws *r v w*.

M is the header, which is supported in bearings in the sides *d'* of a frame, N, which is made adjustable vertically and longitudinally by means of suitable slots and screws, in order that the projecting point or teat *e'* at its front end may be always exactly in line with the score or aperture formed between the griping-dies for the reception of the nail. The opposite end of the header is loosely connected by means of a plate, *f'*, and pin *g'* with an arm, *h'*, projecting up from a rock-shaft, P, which is actuated by a pitman, Q, pivoted thereto at *i'*, and at its upper end to a crank-pin on the end of the driving-shaft C, which, as it revolves, produces through the connections described and at the desired time a reciprocating rectilinear motion of the header M, the projecting teat *e'* of which is thus moved back and forth in a straight line, which enables it to enter the end of the score between the dies, as seen in Fig. 5, and compress the end of the blank, as required, to give it a square, even, or perfect finish, and then be withdrawn therefrom without any liability of its being bent or broken, as would occur if the header moved in the arc of a circle, as has hitherto been customary in machines of this description.

*k'* is a set-screw, which passes through the arm *h'* and strikes against the end of the header M, whereby it can be readily adjusted in the direction of its length.

If desired, the bed-cutter or either of the dies may be made of several pieces secured immovably together, to facilitate the making of the cutting-edges or griping ends of any desired shape.

The above-described machine is simple, durable, and effective, and not liable to get out of repair, and although specially adapted for making shoe or other nails with notches, grooves, or indentations extending from one end to the other, yet it may be used, if desired, for making nails of other descriptions of tacks.

What we claim as our invention, and desire to secure by Letters Patent, is—

1. In a nail or tack machine, the combination, with the cutters, of the stationary and movable griping-dies H I, the latter formed of two portions, *l m*, adapted to be moved independently of each other and be brought successively into contact with the blank, and then advance together to entirely inclose and simultaneously compress the blank throughout its entire length, substantially in the manner and for the purpose described.

2. In a nail or tack machine, the combination, with the griping-carriage B and the stationary die H, of the die I, having the portion *m* secured immovably thereto, and the portion *l*, adapted to slide in a guide or bearing, the lever *p*, with its screw *r*, cam *q*, screw *w*, and spring *s*, all constructed to operate substantially in the manner and for the purpose set forth.

3. In a nail or tack machine, the combination, with the stationary and movable griping-dies H I, the latter formed of two portions, *l m*, adapted to operate as described, of the carrier K, lever L, and pin *t*, substantially as set forth.

Witness our hands this 6th day of December, A. D. 1880.

LEANDER SOULE.
HENRY R. PACKARD.

In presence of—
OTIS ALLEN,
JAMES BETAGH.